United States Patent
Etnyre

(10) Patent No.: US 6,799,114 B2
(45) Date of Patent: Sep. 28, 2004

(54) SYSTEMS AND METHODS FOR CORRELATION IN AN AIR TRAFFIC CONTROL SYSTEM OF INTERROGATION-BASED TARGET POSITIONAL DATA AND GPS-BASED INTRUDER POSITIONAL DATA

(75) Inventor: Lee McNeil Etnyre, Keizer, OR (US)

(73) Assignee: Garmin AT, Inc., Salem, OR (US)

( * ) Notice: Subject to any disclaimer, the term of this patent is extended or adjusted under 35 U.S.C. 154(b) by 168 days.

(21) Appl. No.: 10/277,769

(22) Filed: Oct. 22, 2002

(65) Prior Publication Data

US 2003/0097216 A1 May 22, 2003

Related U.S. Application Data

(60) Provisional application No. 60/331,871, filed on Nov. 20, 2001.

(51) Int. Cl.$^7$ ................................. G01S 5/02
(52) U.S. Cl. ....................... 701/120; 701/301; 701/200; 342/29; 340/945; 244/1 R
(58) Field of Search ................................ 701/120, 121, 701/122, 200, 202, 205, 209, 210, 211, 213, 300, 301, 302, 1, 4, 9, 14, 25; 342/29, 36, 46; 340/907, 945, 967, 970, 974, 988; 244/1 R

(56) References Cited

U.S. PATENT DOCUMENTS

| | | | |
|---|---|---|---|
| 3,781,530 A | * 12/1973 | Britland et al. ............. | 701/301 |
| 5,570,095 A | 10/1996 | Drouilhet, Jr. et al. | |
| 6,262,679 B1 | 7/2001 | Tran | |
| 6,463,383 B1 | * 10/2002 | Baiada et al. ................ | 701/120 |
| 6,631,384 B1 | * 10/2003 | Richman et al. ......... | 707/104.1 |

OTHER PUBLICATIONS

Juan A. Basada, Jesus Garcia, Gonzalo De Miguel, Jose R. Casar, Ganzalo Gavin; *ADS Bias Cancellation based on Data Fusion with Radar Measurements*; Proceedings of the Third International Conference on Information Fusion, Paris, France (Cat. No. 00EX438); Jul. 2000; pp. WEC5/23—30; vol. 2, XP010505091; Int. Soc. Inf. Fusion, USA; ISBN 2–7257–0001–9; USA.

Vincent Capezzuto, David Olster, Michael Curry, Steven L. Pendergast; *Runway Incursion Reduction Program (RIRP) Surveillance System, NASA/FAA Atlanta Demonstration*; Digital Avionics Systems Conference, Proceedings, 17$^{th}$ DASC, the AIAA/IEEE/SAE; 1998; pp. F31–1–F31–8; XP010318118; ISBN: 0–7803–5086–3. USA.

Angela M. Pawlowski, Peter M. Gerken; *Simulator, Workstation, and Data Fusion Components for Onboard/Offboard Multi–Target Multi–Sensor Fusion*; Digital Avionics Systems Conference, Proceedings, 17$^{th}$ DASC, The AIAA/IEEE/SAE; IEEE, US; 1998; pp. C31—1—C31—8; XP010318102; ISBN: 0–7803–5086–3. USA.

* cited by examiner

Primary Examiner—William A. Cuchlinski
Assistant Examiner—Olga Hernandez
(74) Attorney, Agent, or Firm—Devon A. Rolf

(57) ABSTRACT

An improved system and methods for correlating an interrogation-based air traffic surveillance intruder, such as an Traffic alert and Collision Avoidance System (TCAS) intruder, and a GPS-based air traffic surveillance target, such as an Automatic Dependent Surveillance Broadcast (ADS-B) target to minimize or eliminate the display of two symbols for the same intruder/target on the CDTI of an aircraft. The method comprises the steps of receiving ADS-B data at a processing unit and calculating select component deltas for the ADS-B data versus an entry in a TCAS intruder file. Progressive weights are assigned to the deltas and the progressive weights are summed, resulting in a total confidence score. Total confidence scores of ADS-B target and TCAS intruder pairs are compared to determine correlation between the ADS-B target and the TCAS intruders.

23 Claims, 3 Drawing Sheets

SYSTEMS AND METHODS FOR CORRELATION IN AN AIR TRAFFIC CONTROL SYSTEM OF INTERROGATION-BASED TARGET POSITIONAL DATA AND GPS-BASED INTRUDER POSITIONAL DATA

CROSS REFERENCE TO RELATED APPLICATION

The present application claims the benefit of U.S. Provisional Application No. 60/331,871, entitled ADS-B and TCAS Intruder Correlation, filed Nov. 20, 2001, the contents of which are incorporated herein by reference.

FIELD OF THE INVENTION

The present relates to a method and system for multi-source intruder correlation and, more particularly to a method and system for intruder/target correlation between a Global Positioning System (GPS) based air traffic control system, such as Automatic Dependent Surveillance Broadcast (ADS-B), and Traffic Alert and Collision Avoidance System (TCAS) intruder in an air traffic control environment.

BACKGROUND OF THE INVENTION

The recent advent of the use of Automatic Dependent Surveillance-Broadcast (ADS-B), an advanced air ground traffic control system, has facilitated the integration of this system with the pre-existing Traffic Alert and Collision Avoidance System (TCAS).

ADS-B is a technology which allows aircraft to broadcast information such as identification, position, altitude. This broadcast information may be directly received and processed by other aircraft or received and processed by ground systems for use in improved situational awareness, conflict avoidance and airspace management. ADS-B incorporates the use of Global Positioning System (GPS) or other similar navigation systems as a source of position data. By using GPS or the like, ADS-B has the capacity to greatly improve the efficiency and safety of the National Airspace System.

ADS-B provides for an automatic and periodic transmission of flight information from an in-flight aircraft to either other in-flight aircraft or ground systems. The ADS-B transmission will typically comprise information items such as altitude, flight ID, GPS (Global Positioning System) position, velocity, altitude rate, etc. The transmission medium for ADS-B can implement VHF, 1090 MHz (Mode S), UHF (UAT), VDLM4 or a combination of systems.

The TCAS system was implement by the Federal Aviation Administration (FAA) in the 1980's to provide aircraft with an on-board collision avoidance system. Since TCAS's inception it has become a standard for air traffic safety in the United States and abroad. There are two different versions of TCAS, for use on different classes of aircraft. The first, TCAS I, indicates the bearing and relative altitude of all aircraft within a selected range (generally 10 to 20 miles). With color-coded symbols, the Cockpit Display of Traffic Information (CDTI) (i.e., the display) indicates which of the aircraft pose a potential threat. This constitutes the traffic advisory (TA) portion of the system. When pilots receive a TA, they must visually identify the intruding aircraft and may alter their plane's altitude by up to 300 feet. TCAS I does not offer solutions for avoidance of a potential threat, but does supply pilots with important data so that they can determine the best course of action.

In addition to a traffic display, the more comprehensive TCAS II also provides pilots with resolution advisories (RAs) when needed. The system determines the course of each aircraft and whether it is climbing, descending or flying straight and level. TCAS II then issues an RA advising the pilots to execute the type of evasive maneuver necessary to avoid the other aircraft, such as "Climb" or "Descend." If both planes are equipped with TCAS II, then the two computers offer deconflicting RAs. In other words, the pilots do not receive advisories to make maneuvers that would effectively cancel each other out, resulting in a continued threat.

Thus, the collision avoidance logic for TCAS II takes the collected data on the flight patterns of other aircraft and determines whether any of them present a potential collision threat. The overall system does not limit itself to the display of other planes, like a conventional radar screen, but offers warnings and solutions in the form of traffic advisories (TAs) and resolution advisories (RAs).

Traffic alert and Collision Avoidance Systems (TCAS) functionality can be improved with the GPS positioning capabilities of the ADS-B system. Such GPS position information will aid TCAS in determining more precise range and bearing at longer ranges. With greater precision, commercial aircraft can achieve higher safety levels and perform enhanced operational flying concepts such as in-trail climbs/descents, reduced vertical separation, and closely sequenced landings.

Additionally, GPS-based air traffic control systems, such as ADS-B, can also be used to extend traffic surveillance over greater distances. Previous technology limited surveillance ranges to a maximum of about 40 nautical miles (nmn). ADS-B, since it does not require an active TCAS interrogation to determine range and bearing, will not be subject to a power limitation. As a result, in general, the ADS-B receiver capability determines surveillance range. For example, if the ADS-B receiver can process an ADS-B transmission out to 100 nm, then 100 nm is the effective range.

Currently, ADS-B technology is limited in deployment to a select, but constantly growing, number of aircraft while TCAS is a more industry wide standard. As such, the vast majority of current aircraft will rely solely on TCAS intruder data as a means of identifying and avoiding other aircraft within a specified range. Aircraft that are currently equipped with both ADS-B and TCAS technology can benefit from both data streams if the information can be correlated and integrated to provide for more accurate and precise identification of intruders/targets.

Due to variances in accuracy and resolution, the ADS-B and TCAS data for a single intruder aircraft will not be identical. Thus, uncorrelated ADS-B and TCAS data will typically result in two distinct symbols displayed on the CDTI. Therefore, a need exists to provide an on-board correlation method that will allow for a common intruder aircraft to be displayed as a single symbol on a CDTI. Correlation of the data serves to reduce display clutter or confusion that might arise from the display of multiple position symbols for the same intruder/target aircraft.

SUMMARY OF THE INVENTION

The present invention provides improved systems and methods for correlating interrogation-based air traffic surveillance, such as Traffic alert and Collision Avoidance System (TCAS) and GPS-based air traffic surveillance, such as Automatic Dependent Surveillance Broadcast (ADS-B). As a result the correlation process minimizes or eliminates the display of two symbols for the same intruder/target on the CDTI of an aircraft. The data correlation and integration process of the present invention allows one unique symbol to be displayed on the CDTI, if the same reporting aircraft is equipped with ADS-B and TCAS broadcast/interrogation capabilities.

Many current aircraft implement interrogation, such as TCAS, as a means of determining intruder aircraft (i.e., aircraft within a specified range), while GPS-based broadcasts, such as ADS-B broadcasts, are somewhat more limited in their current use and availability. As such, the present invention serves to correlate the data in those instances where an aircraft is equipped with both interrogation-based and GPS-based air traffic surveillance capabilities and provide a single icon to a CDTI representing the correlated intruder/target. In instances where aircraft are limited to TCAS interrogation or ADS-B broadcast (i.e. no correlation is needed), the present invention will provide an icon to the CDTI representing an intruder or a target based on the source of data.

In one embodiment of the invention a method for correlating positional data in interrogation-based surveillance and positional data in GPS-based surveillance comprises the steps of receiving a GPS-based broadcast from a target including positional data, correlating the target positional data with positional data from an one or more entries in a interrogation-based intruder file associated with one or more intruders and displaying a single icon on a display terminal if the correlation process results in a determination that the target and one of the intruders are the same aircraft.

In a specific embodiment of the invention a method for correlating TCAS and ADS-S data in an air traffic collision avoidance system comprises the steps of receiving an ADS-B broadcast from an ADS-B target including positional data, correlating the ADS-B positional data with positional data from an one or more entries in a TCAS intruder file associated with one or more TCAS intruders and displaying a single icon on a display terminal if the correlation process results in a determination that the ADS-B target and one of the TCAS intruders are the same aircraft.

Typically, the positional data in the ADS-B broadcast will be used in conjunction with onboard positional data to derive the positional components that will be correlated with the data found in the TCAS intruder file. The TCAS intruder file stores a finite number of entries (typically 30) related to the intruders in proximity to ownship. The correlation method compares the positional data related to the ADS-B target and each TCAS intruder in the file and determines which, if any, ADS-B target and TCAS intruder is the most correlated in terms of position. If the correlation process is successful then the ADS-B target and the TCAS intruder are deemed to be the same aircraft and the cockpit display of traffic information (CDTI) displays one icon on the display terminal representing one aircraft. If the correlation process does not result in the ADS-B target and any TCAS intruder in the file being correlated then the CDTI displays two icons representing two possible aircraft.

In one embodiment of the invention the correlation method comprises the following steps. The method is initiated by determining deltas of predetermined components of the ADB-S positional data and positional data associated with a TCAS intruder file entry. In one embodiment of the invention the predetermined components are defined as range, relative altitude and relative bearing. The deltas are assigned a predetermined progressive weight and they are then summed to ascertain a total confidence score. This process is undertaken for every qualifying ADS-B target and TCAS intruder correlation pair. After all entries in the intruder file have been processed a determination is made as to which pairing has the highest total confidence score. The highest total confidence score is deemed to be correlated (i.e., the same aircraft) and one icon is displayed on the CDTI.

In one embodiment of the present invention the correlation routine may compare one GPS-based broadcast message related to a target to all entries in the interrogation-based entry file, each entry related to an intruder. In an alternate embodiment, the correlation routine may compare multiple GPS-based broadcast messages related to multiple targets to all entries in the interrogation-based entry file.

The invention is also embodied in a system for correlating interrogation-based intruder position data and GPS-bases target position data in an air traffic control system. The system will comprise a means for receiving a GPS-based broadcast associated with a target, the broadcast including positional data. The means for receiving a GPS-based broadcast may include a Mode S transponder, a Universal Access Transceiver (UAT), a VHF Data Link Mode 4 (VDLM4) or any other suitable communication receiver. The system also includes a memory component that stores interrogation-based positional data for one or more intruders. Typically the intruder file will comprise positional data related to a finite number of nearest in proximity intruders. The correlation system includes a processing unit that receives positional data associated with the target from the GPS-based broadcast receiving means and positional data of an intruder from the memory component and implements a routine to determine if the target and the intruder are a single aircraft. The system also implements a display terminal that indicates a single icon if the processing unit determines that the target and the intruder are a single aircraft and two different icons if the processing unit determines that the target and the intruder are individual aircraft.

Through the use of progressive weighting and correlation screening routines the systems and methods of the present invention are able to precisely and accurately correlate GPS-based air traffic surveillance related to targets, such as ADS-B targets and interrogation-based air traffic surveillance related to intruders, such as TCAS intruders. The systems and methods of the present invention are able to overcome variances in accuracy and resolution that result in the ADS-B and TCAS data being incompatible. As such, the present invention is able to correlate the ADS-B and TCAS data such that a single intruder/target aircraft icon is displayed on the CDTI onboard an aircraft, lessening inaccuracies and display confusion on the display terminal.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention provides improved systems and methods for intruder/target correlation between a traditional interrogation-based air traffic surveillance system, such as Traffic alert and Collision Avoidance System (TCAS) intruder aircraft and a GPS-based air traffic surveillance system, such as Automatic Dependent Surveillance Broadcast (ADS-B). The improved system and method will minimize or eliminate the display of two symbols for the same intruder/target on the CDTI of an aircraft.

Figure 1:
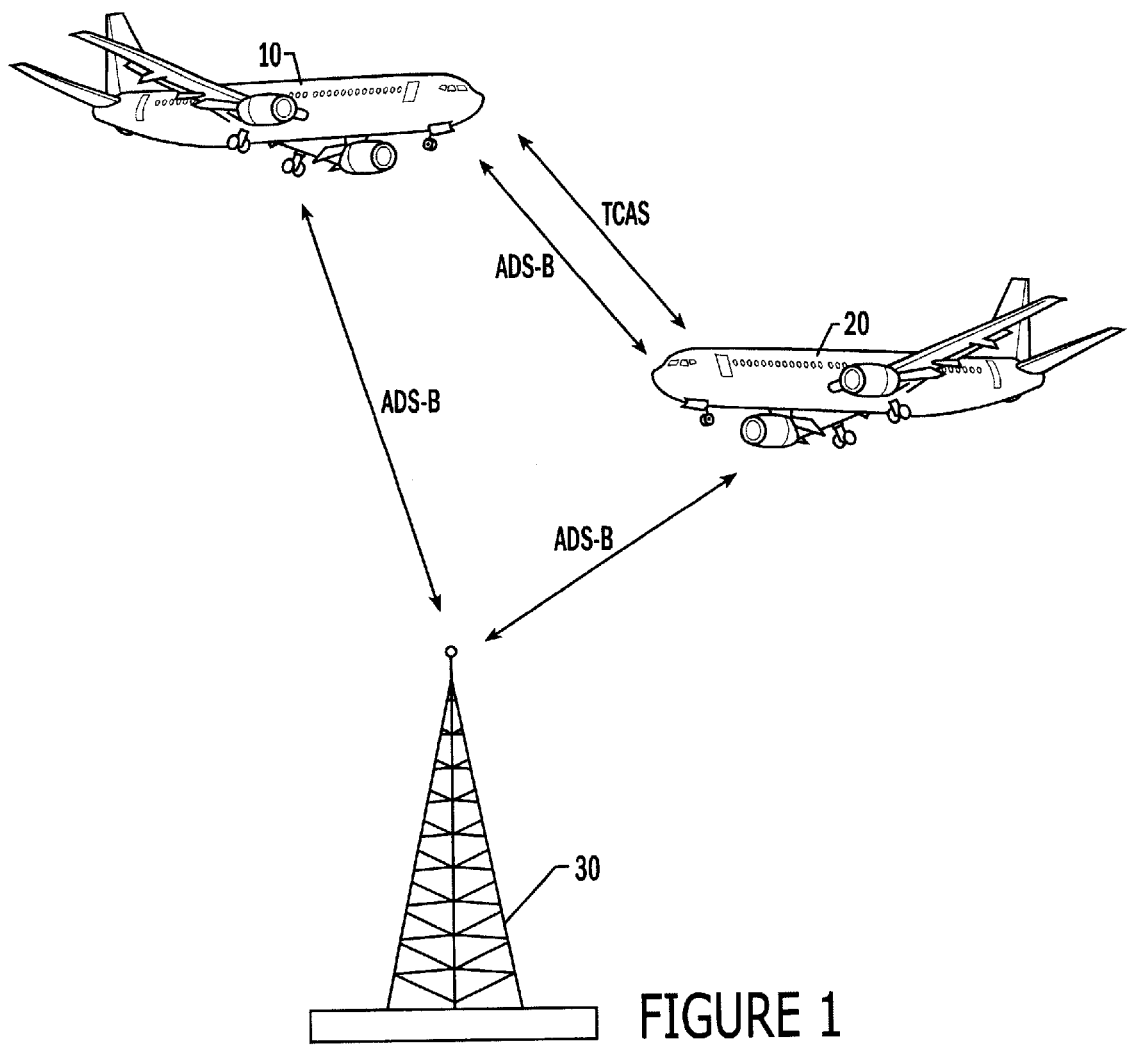
FIG. 1 is a schematic illustration of aircraft communication in an air traffic control system, in accordance with an embodiment of the present invention.

As shown in the schematic diagram of FIG. 1, a first aircraft 10 that is equipped with a GPS-based air traffic surveillance system, such as ADS-B transmits and receives ADS-B position data to and from surrounding aircraft equipped with ADS-B capabilities, such as second aircraft 20. It is also possible for the aircraft to transmit ADS-B communications to the ground station 30 and then have the ground station relay the communications to surrounding aircraft equipped with ADS-B capability.

In the FIG. 1 depiction, aircraft 10 and 20 are also equipped with the capability to receive TCAS intruder data, based on replies to TCAS interrogations of the other aircraft's Mode S or Mode C transponder.

At least one of aircraft 10, 20 will further include a target/intruder correlation system, such as a computer-based system programmed in accordance with an embodiment of the present invention, for implementing the methods of the present invention as set forth herein.

It should be noted, that while FIG. 1 illustrates aircraft that are equipped to receive replies to both TCAS interrogations and ADS-B broadcasts, in the current avionics industry, aircraft will vary in their capability to transmit and receive ADS-B broadcasts and/or TCAS interrogations. It is also noted that for the purpose of differentiating between ADS-B and TCAS within the body of the patent, the term "intruder" is used in reference to the TCAS system and the term "target" is used in reference to the ADS-B. Both terms, "target" and "intruder", refer to aircraft that are in proximity to the ownship. If the correlation process is successful, then a determination is made that the ADS-B target and the TCAS intruder are the same aircraft (equipped with both surveillance systems) and thus, only one icon needs to be displayed on the CDTI to indicate such.

As an initial matter, a brief discussion of pertinent flight data comprising a TCAS intruder data file and an ADS-B broadcast is provided. It should be noted this is not a comprehensive listing, but rather lists only the data required to correlate the broadcasts, in accordance with an embodiment of the present invention. Other TCAS intruder data and ADS-B target data may also be used to correlate the TCAS intruder and the ADS-B target in alternate embodiments of the present invention. The TCAS reply will include the following information fields:

1. Relative Bearing, defined as the angle from the ownship to the intruder aircraft with respect to the ownship track over the ground, quantized in about 0.166 degree increments. Note: the accuracy is 27 degrees rms (root mean square) peak for intruder elevations between +/−10 degrees, and 45 degrees rms for increased elevations (as specified by the avionic standard for TCAS-II, catalog DO-185A issued by the Radio Technical Commission for Aeronautics (RTCA)).

2. Range, defined as the distance between the ownship and the intruder aircraft, quantized in units of 0.0625 nautical miles (nm).

3. Relative Altitude, defined as the difference in altitude between the intruder aircraft and the ownship, quantized in units of 100 feet. A positive value indicates that the intruder aircraft is above the ownship, while a negative value indicates that the intruder aircraft is below the ownship.

Each extended ADS-B message or broadcast that is sent from an equipped aircraft will typically comprise the following information fields:

1. Latitude and Longitude. The aircraft's current geographical position defined in latitude and longitude.

2. North-South and East-West Velocity. North-South and East-West components of the aircraft's velocity, quantized in units of knots.

3. Pressure Altitude. The aircraft's barometric altitude quantized in units of feet. UAT (Universal Access Transceiver) data links quantize altitude in 25 feet increments, the 1090 Mode S data links quantize altitude in 25 feet increments below 50,175 feet and quantize altitude in 100-foot increments above 50,175 feet.

The ownship receives and uses the above ADS-B message data, in addition to its own position and altitude data, to calculate components equivalent to the Relative Bearing, Range, and Relative Altitude components of the TCAS intruder data file.

In accordance with the present invention, a method is provided for correlating between a GPS-based air traffic target, such as an ADS-B target and an interrogation-based air traffic intruder, such as a TCAS intruder. The method comprises comparing selected components of a TCAS intruder file to the corresponding, calculated components of an ADS-B broadcast, typically range, relative bearing, and relative altitude. The comparison is accomplished by calculating the deltas between the selected components, such as Δ range, Δ relative altitude and Δ relative bearing. The deltas are compared to a minimum correlation threshold and progressive weighting results in a confidence score for each component comparison. The confidence scores are then combined to produce a total confidence score used to determine whether to declare the intruders/targets as correlated. The method is described herein in further detail.

Figure 2:
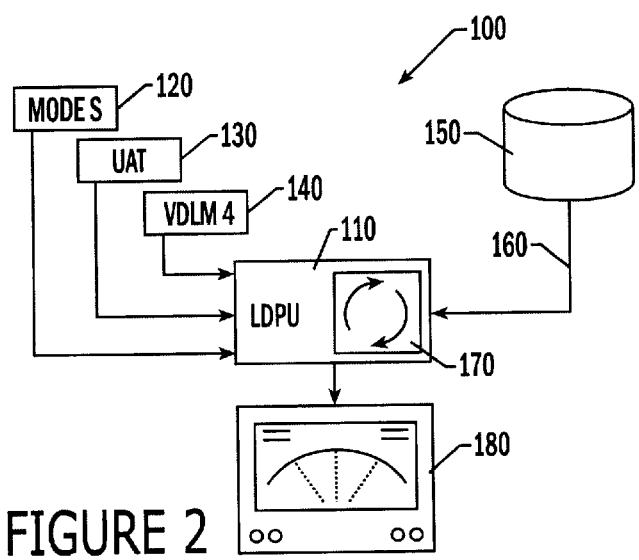
FIG. 2 is a schematic representation of a system for implementing correlation of ADS-B targets and TCAS intruders, in accordance with an embodiment of the present invention.

The block diagram of FIG. 2 illustrates an intruder/target correlation system 100, in accordance with an embodiment of the present invention. The correlation system includes a processing unit 110, such as a Link and Display Processing Unit (LDPU) that receives traffic surveillance data from ADS-B datalinks, including a Mode S transponder 120, a Universal Access Transceiver (UAT) 130 and VHF Data Link Mode 4 (VDLM4) 140. This processing unit will also receive stored TCAS intruder file data from memory device 150 communicated from data bus 160, such as the TCAS TA-RA data bus described in Aeronautical Radio, Inc. (ARINC) Characteristic 735A. The processing unit will perform the correlation algorithm 170 of the present invention and output correlated intruder/target data to the Cockpit Display Terminal Information (CDTI) 180. While in most applications the processing unit, ADS-B data links, TCAS intruder file and CDTI will be located onboard the aircraft it is possible to configure the system such that one or more components of the system are located remote from the aircraft, such as at the ground station.

TCAS, and more specifically the TCAS intruder file, provides for a finite data file capacity. In this regard, TCAS has the capacity to provide information on a finite number of intruders. In a current embodiment of the TCAS system the intruder data file capacity is 30 intruders, with each intruder being assigned a number between, and including 0 and 31. The same number is not used twice in the same file. In this regard, the correlation method of the present invention has a capacity to correlate up to a maximum of 30 intruders, representing those intruders in proximity to ownship having the highest TA (Traffic Advisory) score determined by the TCAS threat logic. Intruder files are provided to the processing unit 110 at a rate of 2 per second. In normal operation, no intruder number will be reassigned until at least one second after its assignment to an intruder is discontinued. However, under certain exceptional circumstances discussed in ARINC Characteristic 735A, an intruder number may be reused immediately.

Figure 3:
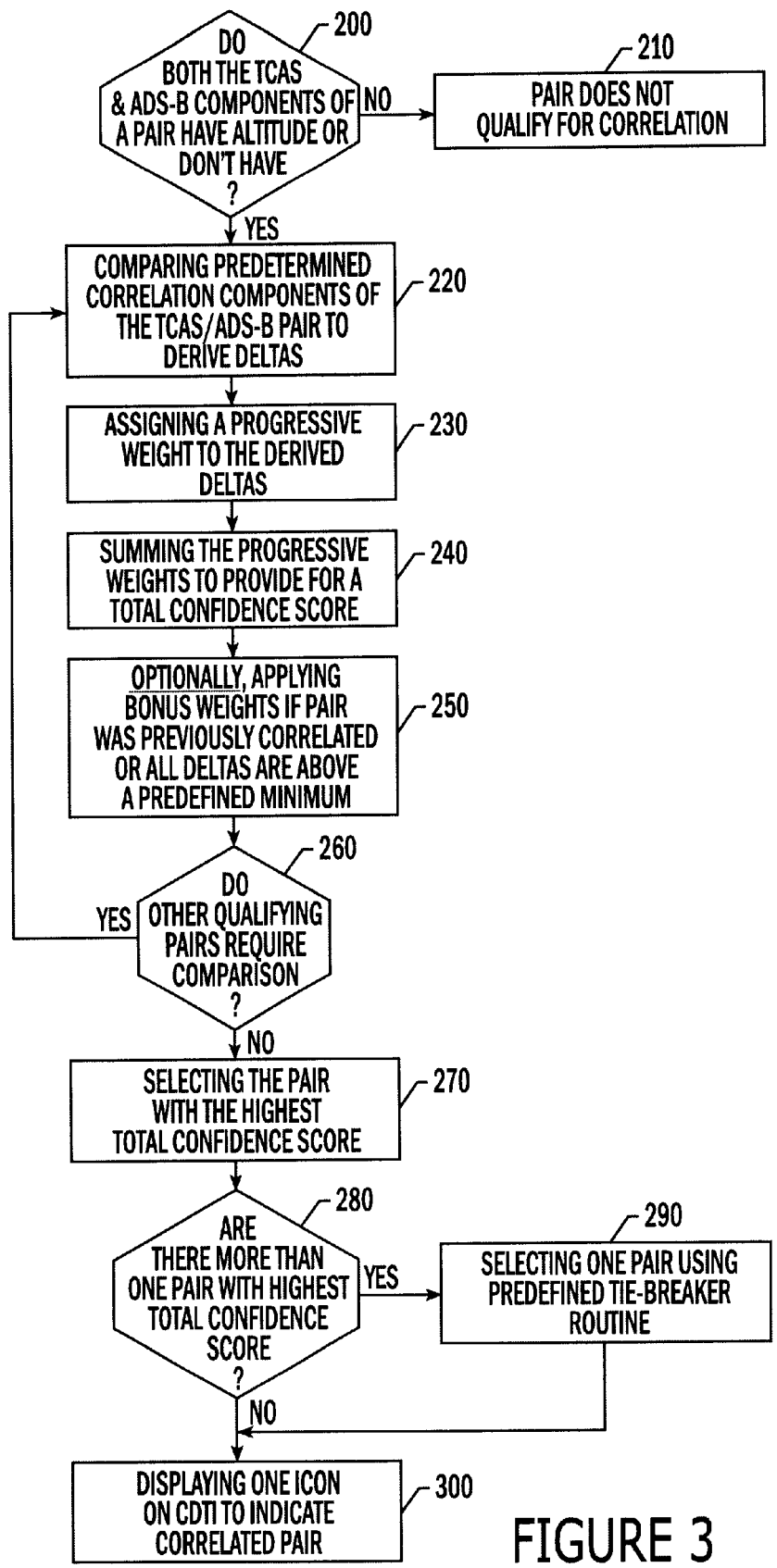
FIG. 3 is a flow diagram for correlating a single ADS-B target and multiple TCAS intruders, in accordance with an embodiment of the present invention.

FIG. 3 is a flow diagram depicting a flow of the correlation process of a GPS-based surveillance, such as ADS-B and an interrogation-based surveillance, such as TCAS, in accordance with an embodiment of the present invention. In this particular embodiment of the invention, the correlation process occurs between a single ADS-B broadcast (representing one ADS-B target) and all of the entries in the TCAS entry file, (representing up to 30 different TCAS intruders) to determine if one of the entries in the TCAS file (i.e., one of TCAS intruders) can be correlated with the ADS-B broadcast (i.e., the ADS-B target).

To be initially considered for correlation, an initial determination 200 is undertaken to determine all of the qualifying TCAS intruder/ADS-B target pairs in which both the ADS-B target and the TCAS intruder have an altitude component or both do not have an altitude component. If a determination is made that one of the components of an intruder/target pair does not include altitude, then, at step 210, this pair does not qualify for correlation and is excluded from further correlation processing.

At step 220, the correlation process continues by comparing predetermined correlation components of the first qualifying TCAS/ADS-B intruder pair. In one embodiment of the invention the predetermined correlation components may be range, relative bearing, and relative altitude. The comparison is typically accomplished by calculating the deltas between the selected components, such as Δ range, Δ relative altitude and Δ relative bearing. Once the deltas have been calculated, at step 230, a predefined progressive weighting system is employed to determine a confidence score for each selected component.

Table 1 illustrates an example of a TCAS/ADS-B progressive weighting scheme in accordance with an embodiment of the present invention. Thus, in accordance with the table, if the delta for relative altitude is greater than 0.0 but equal or less than 50.0, then a progressive weight of 1007.05 is assigned. If the delta for relative altitude is greater than 50.0 but equal or less that 100.0, then a progressive weight of 1003.4 is assigned and so on.

TABLE 1

| Relative Altitude (feet) | | Relative Bearing (degrees) | | Range (nm) | |
|---|---|---|---|---|---|
| Δ | Weight | Δ | Weight | Δ | Weight |
| 0.0 | 1012.7 | 0 | 1000.9 | 0.0 | 1021.6 |
| 50.0 | 1007.05 | 22.5 | 1000.9 | 0.015625 | 1015.95 |

TABLE 1-continued

| Relative Altitude (feet) | | Relative Bearing (degrees) | | Range (nm) | |
|---|---|---|---|---|---|
| Δ | Weight | Δ | Weight | Δ | Weight |
| 100.0 | 1003.4 | 180.0 | 0.1 (min) | 0.03125 | 1011.3 |
| 150.0 | 1001.7 | | | 0.046875 | 1007.65 |
| 200.0 | 1000.9 | | | 0.0625 | 1005.0 |
| 400.0 | 0.1 (min) | | | 0.078125 | 1003.3 |
| | | | | 0.09375 | 1002.5 |
| | | | | 0.109375 | 1001.7 |
| | | | | 0.125 | 1000.9 |
| | | | | 0.25 | 0.1 (min) |

Once the confidence scores have been assigned for the selected components, at step 240, the confidence scores are summed to provide for a total confidence score. For example, if the delta for range is 0.0625 nm, the delta for relative altitude is 100 ft and the delta for relative bearing is less than or equal to 22.5 degrees then the progressive weights that have been assigned; 1005 for range, 1003.4 for relative altitude and 1000.9 for relative bearing, are added together for a sum value or cumulative confidence score of 3009.3.

At optional step 250, bonus weights may be added to the total confidence score if certain predefined bonus criteria are met. For instance, in one embodiment of the invention a bonus score is added to the total confidence score if the pair undergoing correlation assessment was previously determined to be correlated. This bonus score, typically in excess of the total confidence score, insures that correlation between the pair is not lost or incorrectly invalidated. In another embodiment of the invention, a bonus score is added to the total confidence score if all of the correlation component deltas are above predefined minimum limits. For instance in an embodiment that implements the progressive weighting scheme shown in Table 1, the predefined minimum limits may be 0.125 nm or less for range, 200 feet or less for relative altitude and 22.5 degrees or less for relative bearing. This bonus score, typically in excess of the total confidence score, insures that pairs are not inadvertently correlated if one of the correlation component deltas is outside the prescribed minimum limit for any one component. The total confidence score, in addition to the bonus scores, define the total confidence score for the pair being considered for correlation.

The flow returns to step 220 if a decision is made, at step 260, that other qualifying pairs exist that require correlation component comparison. For another qualifying ADS-B target/TCAS intruder pair (i.e. either both have an altitude component or both do not have an altitude component), deltas for the predetermined correlation components are determined, progressive weights are assigned to the deltas and a total confidence score is determined (steps 220–250). This routine continues until all qualifying ADS-B target/TCAS intruder pairs have an associated total confidence score. For example, if the TCAS entry file has eight entries (each entry related to a specific TCAS intruder) and the ADS-B target broadcast has an altitude component then total confidence scores will be determined for each of entry in the TCAS files that also has an altitude component. If all eight entries have an altitude component then eight total confidence scores will be determined.

At step 270, a comparison is made of all of the total confidence scores to determine which correlation candidate intruder/target pair has the highest total confidence score. If a determination is made, at step 280, that two or more intruder/target pairs have the same total confidence score then, at step 290, a tie breaking process is implemented. In one embodiment of the invention the tie-breaking process involves determining which of the two or more pairs that are tied has the lowest delta for a first predetermined correlation component. If two or more pairs remain tied after comparison of the deltas for the first predetermined correlation component, then the tie-breaking process will look toward a second predetermined correlation component and determine which of the two or more pairs that remain tied has the lowest delta for the second correlation component.

In one embodiment of the invention, the first tie breaker is which pair has the lowest delta for range, the second tie-breaker is which pair has the lowest delta for relative altitude and the third tie-breaker is which pair has the lowest delta for relative bearing. For example, if two pairs have the same total confidence score, the tie-breaking process will determine which of the pairs has the lowest delta for the first predetermined correlation component. If the deltas for the first predetermined correlation component are the same, then the tie-breaking process will determine which of the pairs has the lowest delta for the second predetermined correlation component and so on.

As a result of selecting the pair with the highest total confidence score, or alternatively the pair that prevails in the tie-breaking process a determination is made, at step 300, that this pair represents one aircraft. As such, one icon is displayed on the CDTI to represent that the target/intruder pair is a single aircraft.

Figure 4:
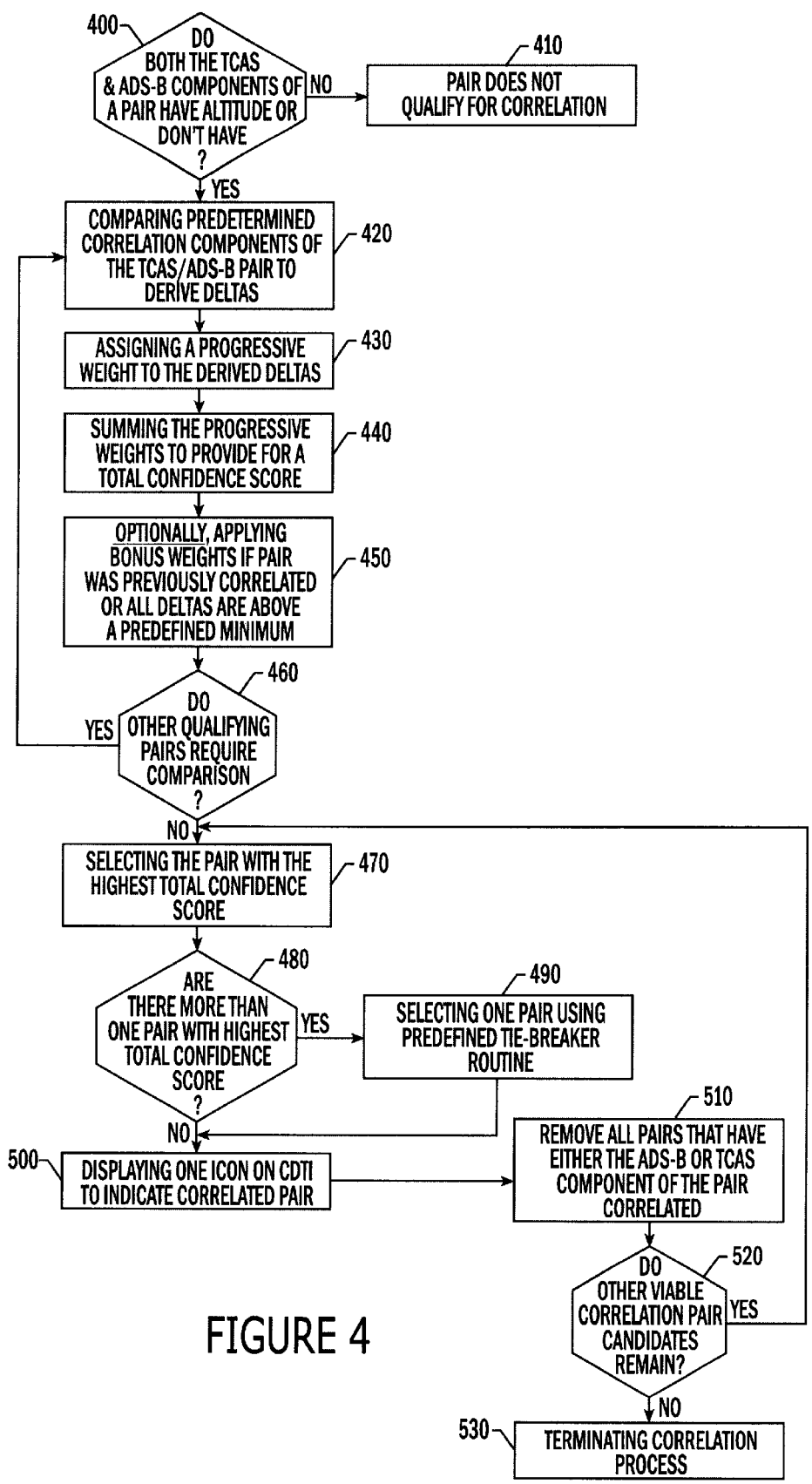
FIG. 4 is a flow diagram for correlating multiple ADS-B targets and multiple TCAS intruders, in accordance with an embodiment of the present invention.

FIG. 4 is a flow diagram depicting a flow of the correlation process of multiple GPS surveillance broadcasts, such as ADS-B broadcast and an interrogation-based communication such as TCAS, in accordance with an embodiment of the present invention. In this particular embodiment of the invention, the correlation process occurs between a multiple ADS-B broadcast (each ADS-B typically broadcast representing a unique ADS-B target) and all of the entries in the TCAS entry file, (representing up to 30 different TCAS intruders) to determine all of the correlations possible between ADS-B targets and the TCAS intruders.

To be initially considered as for further correlation processing, an initial determination 400 is undertaken to determine all of the qualifying TCAS intruder/ADS-B target pairs in which both the ADS-B target and the TCAS intruder have an altitude component or both do not have an altitude component. If a determination is made that one of the components of an intruder/target pair does not include altitude, then, at step 410, this pair is excluded from further correlation processing.

At step 420, the correlation process continues by comparing predetermined correlation components of one of the qualified pairs. In one embodiment of the invention the correlation components may comprise a range, relative bearing, and relative altitude. The comparison is typically accomplished by calculating the deltas between the selected components, such as Δ range, Δ relative altitude and Δ relative bearing. Once the deltas have been calculated, at step 430, a predefined progressive weighting system is employed to determine a confidence score for each selected component.

Once the confidence scores have been assigned for the selected components, at step 440, the confidence scores are summed to provide for a total confidence score.

At optional step 450, optional bonus weights, as described above, may be added to the cumulative confidence score if certain predefined bonus criteria are met.

Once a total confidence score has been determined, a determination is made, at step 460, as to whether more qualified correlation pair candidates exist. If more candidates exist the flow returns to step 420 and for another qualifying ADS-B target/TCAS intruder pair (i.e. either both have an altitude component or both do not have an altitude component), deltas for the predetermined correlation components are determined, progressive weights are assigned to the deltas, the progressive weights are summed, bonus points are optionally added to the summed progressive weights and a total confidence score is determined (steps 420–450). This routine continues until all qualifying ADS-B target/TCAS intruder pairs have an associated total confidence score. For example, if the TCAS entry file has three entries (each entry related to a specific TCAS intruder), two ADS-B broadcasts have been received during the predetermined timeframe and all of the TCAS entries and ADS-B broadcasts have an altitude component then total confidence scores will be determined for all combinations of TCAS file entries and ADS-B broadcasts, in this instance, six total confidence scores will be determined.

At step 470, a comparison is made of all of the total confidence scores to determine which correlation candidate intruder/target pair has the highest total confidence score. If a determination is made, at step 480, that two or more intruder/target pairs have the same total confidence score then, at step 490, a tie breaking process is implemented. In one embodiment of the invention the tie-breaking process involves determining which of the two or more pairs that are tied has the lowest delta for a first predetermined correlation component. If two or more pairs remain tied after comparison of the deltas for the first predetermined correlation component, then the tie-breaking process will look toward a second predetermined correlation component and determine which of the two or more pairs that remain tied has the lowest delta for the second correlation component.

As a result of selecting the pair with the highest total confidence score, or alternatively the pair that prevails in the tie-breaking process, a determination is made, at step 500, that this pair represents one aircraft. As such, one icon is displayed on the CDTI to represent that the target/intruder pair is a single aircraft.

At step 510, all pairs that have, as a component, either the ADS-B target or the TCAS intruder from the pair just correlated are removed from further correlation processing. This removal process includes removal of the pair that, as result of having the highest total confidence score, was determined to be correlated at step 500.

A determination is then made, at step 520, to determine if any qualifying pairs still remain viable correlation candidates (i.e., they have not been correlated nor have they been removed at step 510). If viable correlation candidates remain the process returns to step 470 and selects the pair with the highest total confidence score. If a determination is made, at step 480, that two or more intruder/target pairs have the same total confidence score then, at step 490, the tie breaking process, described above, is implemented. This iterative process continues until the determination is made, at step 520, that no further viable correlation candidates remain. If no further candidates remain, the correlation process is terminated, at step 530, For example, Table 2 illustrates a possible correlation flow routine for a TCAS intruder file having three entries and a timeframe in which three ADS-B broadcasts have been received.

TABLE 2

| ADS-B | TCAS | Possible Pairs and Weights (Step 1, 2) | | | After one pass thru (Step 3–5) | |
|---|---|---|---|---|---|---|
| 1 | 1 | 1 | 1 | 9001 | | |
| 2 | 2 | 1 | 2 | 3002 | | |
| 3 | 3 | 1 | 3 | 4003 | | |
| | | 2 | 1 | 5004 | | |
| | | 2 | 2 | 8001 | 2 | 2 |
| | | 2 | 3 | 3005 | 2 | 3 |
| | | 3 | 1 | 3003 | | |
| | | 3 | 2 | 4002 | 3 | 2 |
| | | 3 | 3 | 8003 | 3 | 3 |

We assume that all of the entries in the TCAS file have altitude components and all of the ADS-B broadcasts have altitude components. Therefore, nine qualifying correlation pair candidates result. After the first pass through the correlation process. The ADS-B (1) and TCAS (1) pair is determined to be correlated because it is has the highest total confidence score of 9001. Since no tie exists for the highest total confidence score, the tie-breaking process is not required. As such, at step 500, one icon is displayed on the CDTI to represent one correlated aircraft. The routine then, at step 510 removes all pairs having ADS-B (1) or TCAS (1) as a component. This results in the removal of the ADS-B (1) TCAS (1) pair (i.e., the correlated pair), the ADS-B (1) TCAS (2) pair, the ADS-B (1) TCAS (3) pair, the ADS-B (2) TCAS (1) pair and the ADS-B (3) TCAS (1) pair. At step 520, the process determines that four qualifying pair candidates remain, specifically the ADS-B (2) (2) pair, the ADS-B (2) TCAS (3) pair, the ADS-B (3) TCAS (2) pair and the ADS-B (3) TCAS (3) pair.

Returning the flow to step 470, the ADS-B (3) and TCAS (3) pair is determined to be the highest total confidence score of those pairs remaining as viable correlation pair candidates. Since no tie exists for the highest total confidence score, the tie-breaking process is not required. As such, at step 500, one icon is displayed on the CDTI to represent the second correlated aircraft. The routine then, at step 510, removes all pairs having ADS-B (3) or TCAS (3) as a component. This results in the removal of the ADS-B (3) TCAS (3) pair (i.e., the second correlated pair), the ADS-B (2) TCAS (3) pair, and the ADS-B (3) TCAS (2) pair. At step 520, the process determines that one qualifying pair candidates remains, specifically the ADS-B (2) (2) pair.

Returning the flow to step 470, the ADS-B (2) and TCAS (2) pair is determined to be the highest total confidence score of those pairs remaining as viable correlation pair candidates. As such, at step 500, one icon is displayed on the CDTI to represent the third correlated aircraft. Since no further viable correlation pair candidates remain the correlation process is terminated, at step 530.

Additionally, in accordance with embodiments of the present invention exceptions may apply to the target/intruder correlation processes described above. A first exception relates to the uncertainty surrounding the TCAS bearing data. If the TCAS measured range from ownship to the TCAS intruder is less than a predefined distance, such as 0.25 nm, than the assigned progressive weight for relative bearing will always be assigned a predefined value, such as 1000.9 (regardless of the calculated relative bearing difference). In effect, this exception means that in instances where the TCAS intruder is relatively close to the ownship, the relative bearing differential information will not be used because in these instances the bearing uncertainty is disproportionately amplified.

A second exception exists if both constituents of the TCAS/ADS-B pair have unknown altitude values and the TCAS intruder is further from ownship than the ADS-B target (i.e., the TCAS range exceeds the ADS-B range). In this instance the correlation of the range data is modified by dividing the range delta value in the progressive weight scheme by a factor of two. For the example shown in Table 1, this would effectively increase the minimum range correlation value from 0.125 nm to 0.25 nm. This modification is undertaken to compensate for the degradation of the correlation; due to the TCAS range being presented as a slant distance in the absence of intruder altitude data in contrast to the ADS-B data continuing to be derived as a horizontal distance (the slant distance being inherently greater than the horizontal distance for an intruder at a different altitude from ownship).

A third exception relates to ADS-B/TCAS pairs that have been previously correlated and are currently closing or separating at a high rate. Typically, closing and separation rates are determined by analyzing the east-west and north-south velocity components of the ADS-B data. In this instance, the range value to lose or invalidate a correlation is increased. In the example shown in Table 1, the range difference of 0.25 nm is increased by the amount of change in range that would occur over a 2-second interval for the closing/separating pair.

Through the use of progressive weighting and correlation screening routines the method and system of the present invention is able to precisely and accurately correlate ADS-B targets and TCAS intruders. The system and methods of the present invention are able to overcome variances in accuracy and resolution that result in the ADS-B and TCAS data being incompatible. As such, the present invention is able to correlate the ADS-B and TCAS data such that a single intruder aircraft icon is displayed on the CDTI onboard an aircraft, lessening inaccuracies and display confusion on the display terminal.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Wherefore the following is claimed:

1. A method for correlating the positional data of a intruder in an interrogation-based air traffic surveillance system and the positional data of a target in a Global Positioning System-based air traffic surveillance system, the method comprising the steps of:

receiving a GPS-based surveillance broadcast from a target including positional data;

correlating the target positional data with positional data from one or more entries in an intruder file, each entry associated with one or more intruders; and displaying a single icon on a display terminal if the correlation process results in a determination that the target and one of the intruders are the same aircraft.

2. The method of claim 1, correlating the target positional data with positional data from one or more entries in an intruder file, each entry associated with one or more intruders further comprises the steps of:

determining deltas of predetermined components of the target positional data and positional data associated with an intruder file entry;

assigning a progressive weight value to the deltas of the predetermined components;

summing the progressive weight values to result in a total confidence score; and determining a highest total confidence score amongst the target positional data and one or more entries in the intruder file associated with one or more intruders.

3. The method of claim 2, further comprising the step of adding an additional value to the total confidence score if the ADS-B target associated with the ADS-B positional data and the TCAS intruder associated with the TCAS intruder file entry have been previously correlated.

4. The method of claim 2, further comprising the step of adding an additional value to the total confidence score if all of the deltas of the predetermined components of the ADB-S positional data and positional data associated with a TCAS intruder file entry exceed predetermined minimum thresholds.

5. The method of claim 2, wherein the predetermined components include relative altitude, relative bearing and range.

6. A method for correlating Traffic alert and Collision Avoidance System (TCAS) intruder aircraft position data and Automatic Dependent Surveillance Broadcast (ADS-B) target position data aircraft in an air traffic control system, the method comprising:

receiving an ADS-B broadcast from an ADS-B target including positional data;

correlating the ADS-B positional data with positional data from an one or more entries in a TCAS intruder file associated with one or more TCAS intruders; and displaying a single icon on a display terminal if the correlation process results in a determination that the ADS-B target and one of the TCAS intruders are the same aircraft.

7. The method of claim 6, wherein correlating the ADS-B positional data with positional data from one or more entries in a TCAS intruder file associated with one or more TCAS intruders further comprises the steps of:

determining deltas of predetermined components of the ADB-S positional data and positional data associated with a TCAS intruder file entry;

assigning a progressive weight value to the deltas of the predetermined components;

summing the progressive weight values to result in a total confidence score; and determining a highest total confidence score amongst the ADS-B positional data and one or more entries in a TCAS intruder file associated with one or more TCAS intruders.

8. The method of claim 7, further comprising the step of adding an additional value to the total confidence score if the ADS-B target associated with the ADS-B positional data and the TCAS intruder associated with the TCAS intruder file entry have been previously correlated.

9. The method of claim 7, further comprising the step of adding an additional value to the total confidence score if all of the deltas of the predetermined components of the ADB-S positional data and positional data associated with a TCAS intruder file entry exceed predetermined minimum thresholds.

10. The method of claim 7, wherein the predetermined components include relative altitude, relative bearing and range.

11. A method for correlating TCAS and ADS-B data in an air traffic collision avoidance system, the method comprising the steps of:

receiving one or more ADS-B broadcasts from one or more associated ADS-B targets including positional data;

matching the one or more ADS-B broadcasts with entries in a TCAS intruder file to determine one or more correlation pair candidates;

calculating deltas for predetermined correlation components of the one or more correlation pair candidates;

assigning predetermined progressive weights to the deltas;

summing the progressive weights to result in a total confidence score;

determining a highest confidence score amongst the one or more correlation pair candidates; and providing for correlation of the correlation pair candidate having the highest confidence score.

12. The method of claim 11, wherein matching the one or more ADS-B broadcasts with entries in a TCAS intruder file to determine one or more correlation pair candidates further comprises qualifying the one or more correlation pair candidates based on one or more predetermined qualification parameters.

13. The method of claim 11, wherein the predetermined correlation components include range, relative altitude and relative bearing.

14. The method of claim 11, further comprising the steps of:

removing from further correlation processing the ADS-B broadcast and the entry in the TCAS intruder file associated with correlated pair to result in one or more remaining viable correlation pair candidates; and determining a next highest confidence score amongst the one or more remaining viable correlation pair candidates; and providing for correlation of the correlation pair candidate having the next highest confidence score.

15. The method of claim 11, wherein providing for correlation of the correlation pair candidate having the highest confidence score further comprises displaying a single icon on a Cockpit Display of Traffic Information (CDTI) representing the correlated pair.

16. A system for correlating an interrogation-based air traffic communication system and GPS based air traffic communication system, the system comprising:

a means for receiving a GPS-based broadcast having positional data associated with a target;

a memory component that stores interrogation-based communication data, the communication data including positional data for one or more intruders;

a processing unit that receives the positional data associated with the target from the means for receiving a GPS-Based broadcast and positional data of an intruder from the memory component and implements a routine to determine if the target and the intruder are a single aircraft; and a display terminal that indicates a single icon if the processing unit determines that the target and the intruder are a single aircraft.

17. The system of claim 16, wherein the means for receiving a GPS-based broadcast comprises a Mode S transponder.

18. The system of claim 16, wherein the means for receiving a GPS-based broadcast comprises a Universal Access Transceiver (UAT).

19. The system of claim 16, wherein the means for receiving a GPS-based broadcast comprises a VHF Data Link Mode 4 receiver.

20. The system of claim 16, wherein the routine to determine if the target and the intruder are a single aircraft includes determining deltas for predetermined positional components, assigning progressive weight values to the deltas, summing the progressive weight values to result in a total confidence score and comparing the total confidence score to determine a highest total confidence score.

21. The system of claim 16, wherein the CDTI indicates distinct icons for the target and the intruder if the routine determines that the target and the intruder are separate aircraft.

22. A computer program product for causing correlation between GPS-based air traffic communication system targets and interrogation-based air traffic communication system intruders, comprising:

a computer usable medium having computer readable program code means embodied in the medium for causing correlation between targets and intruders in an air traffic control system, the computer readable program code including:

computer readable program code for causing said computer to determine a delta between predetermined positional components associated with correlation pair candidates, each correlation pair candidate comprising positional data related to a GPS-based communication and positional data related to an interrogation-based communication;

computer readable program code for causing said computer to assign predetermined progressive weights to the deltas;

computer readable program code for causing said computer to sum the progressive weights to determine a total confidence score; and computer readable program code for causing said computer to compare total confidence scores of the correlation pair candidates to determine a highest total confidence score.

23. The computer program product of claim 22, further comprising computer readable program code for causing said computer to display a single icon on a display terminal if the correlation process results in successful correlation of a target and an intruder and display of two unique icons if the correlation process results in unsuccessful correlation of an the target and the intruder.

* * * * *